Dec. 12, 1933.  G. I. WELSH  1,938,649

DIFFERENTIAL GEAR FOR VEHICLES

Filed June 5, 1931  6 Sheets-Sheet 1

Inventor:
George I. Welsh
By Parker & Carter Attys.

Dec. 12, 1933.    G. I. WELSH    1,938,649
DIFFERENTIAL GEAR FOR VEHICLES
Filed June 5, 1931    6 Sheets-Sheet 2
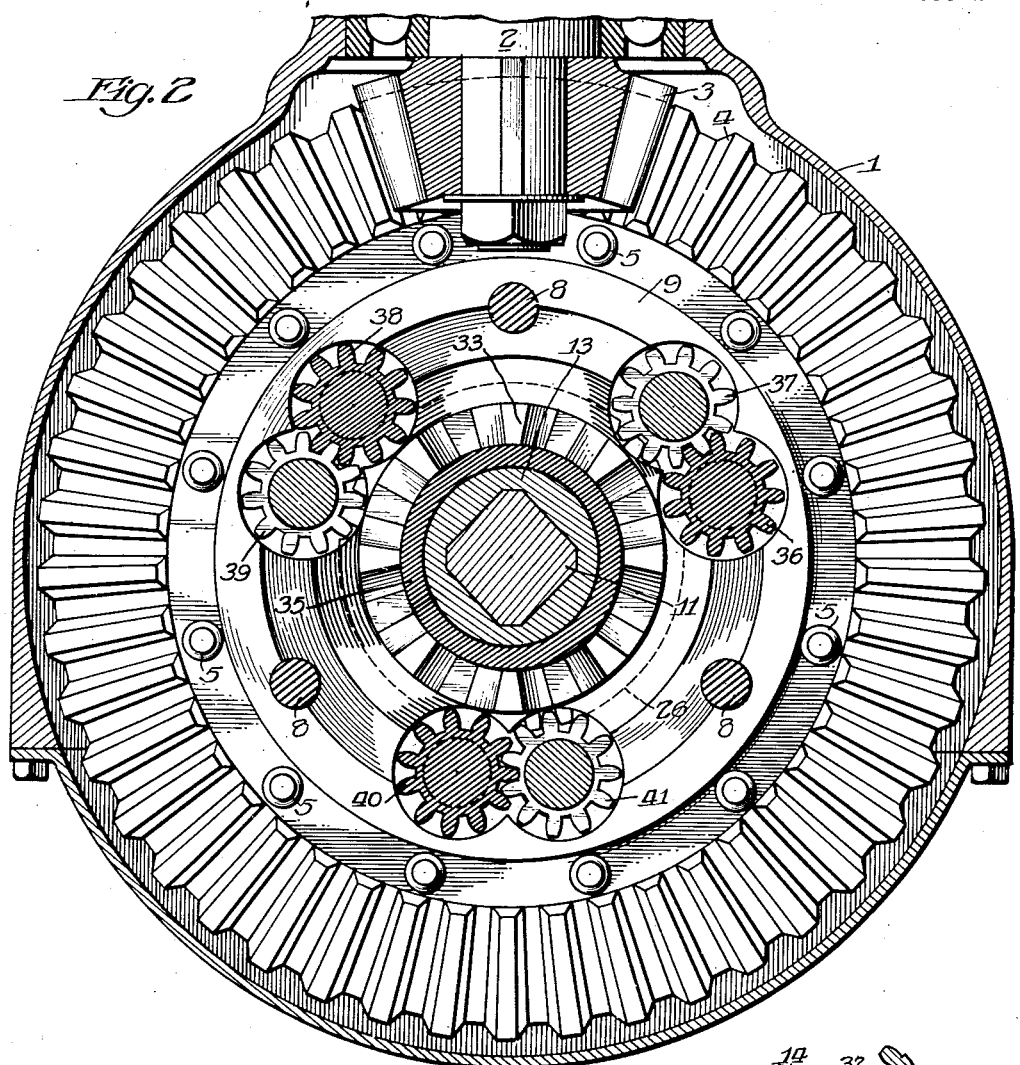
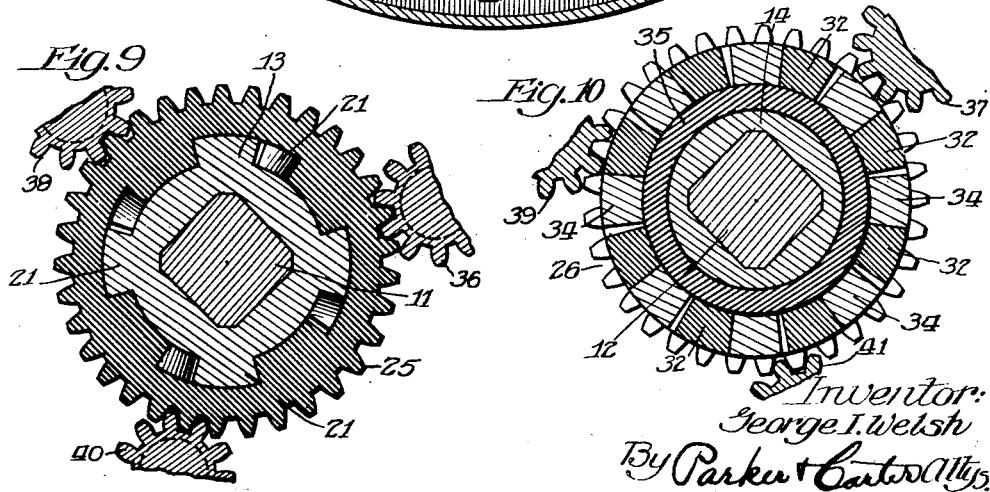
Inventor:
George I. Welsh
By Parker & Carton Attys Dec. 12, 1933.   G. I. WELSH   1,938,649
DIFFERENTIAL GEAR FOR VEHICLES
Filed June 5, 1931    6 Sheets-Sheet 3

Inventor
George I. Welsh
By Parker & Carter Attys

Dec. 12, 1933.  G. I. WELSH  1,938,649
DIFFERENTIAL GEAR FOR VEHICLES
Filed June 5, 1931   6 Sheets-Sheet 4
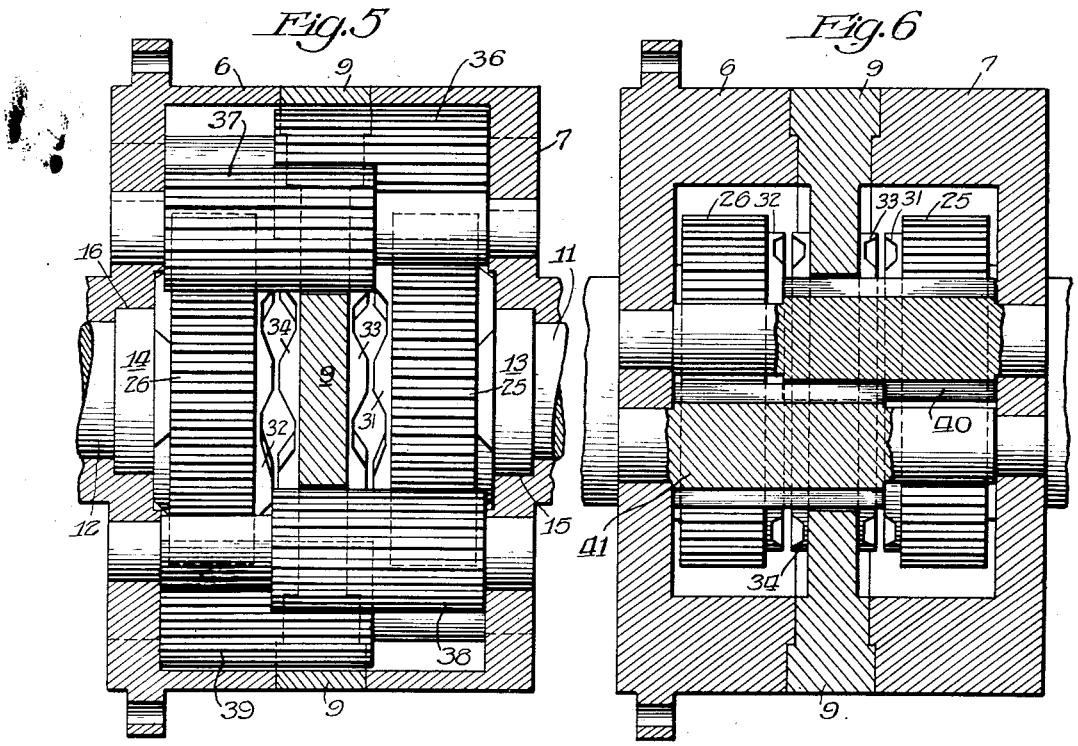
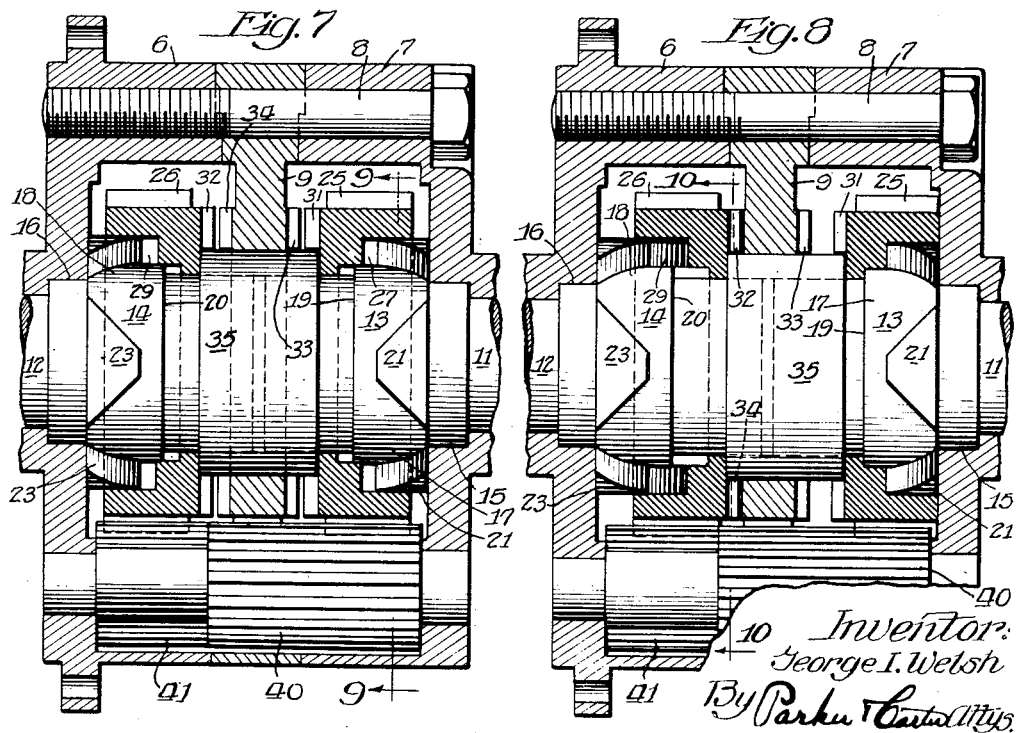
Inventor:
George I. Welsh
By Parker & Carter Attys.

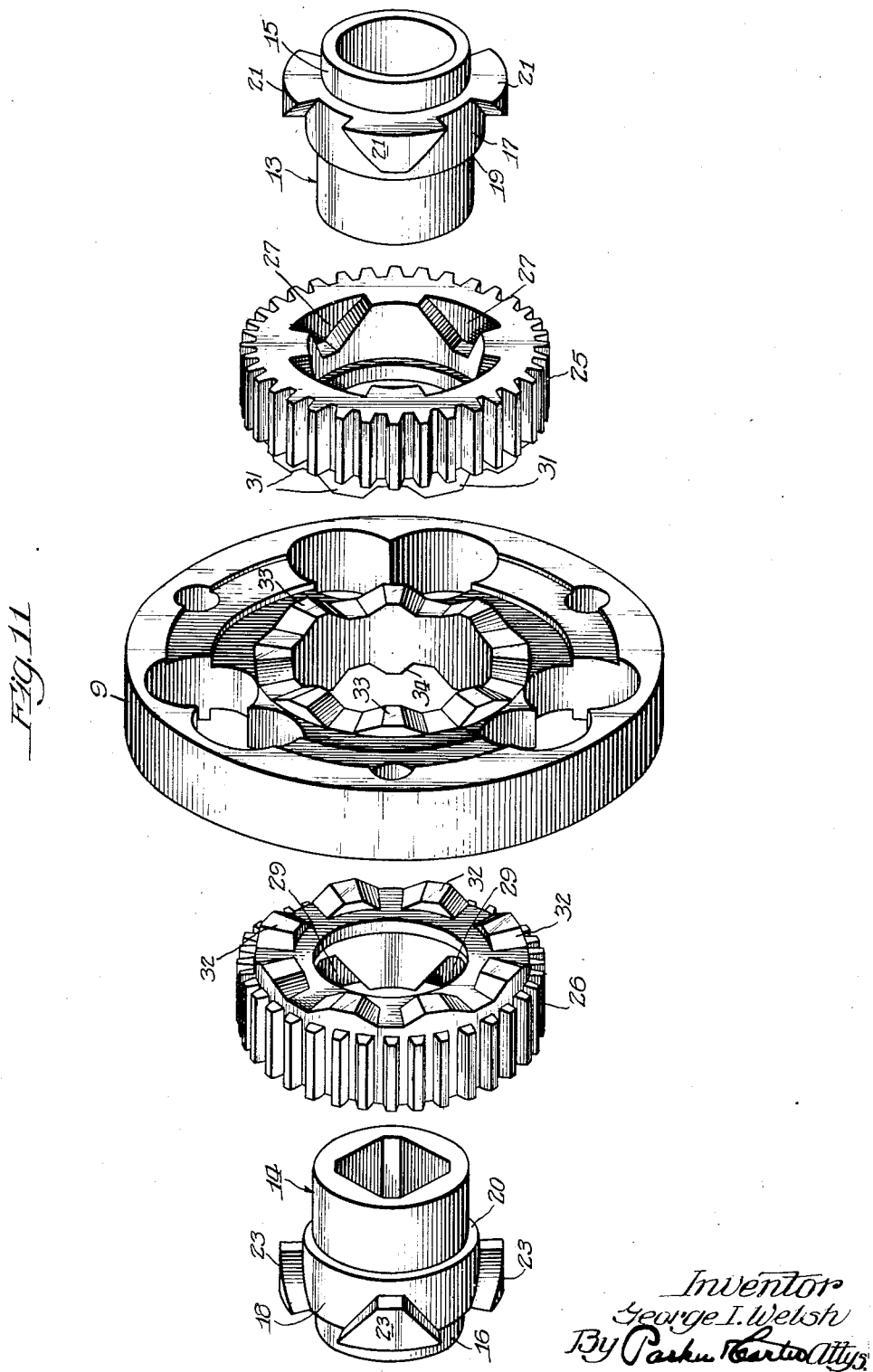

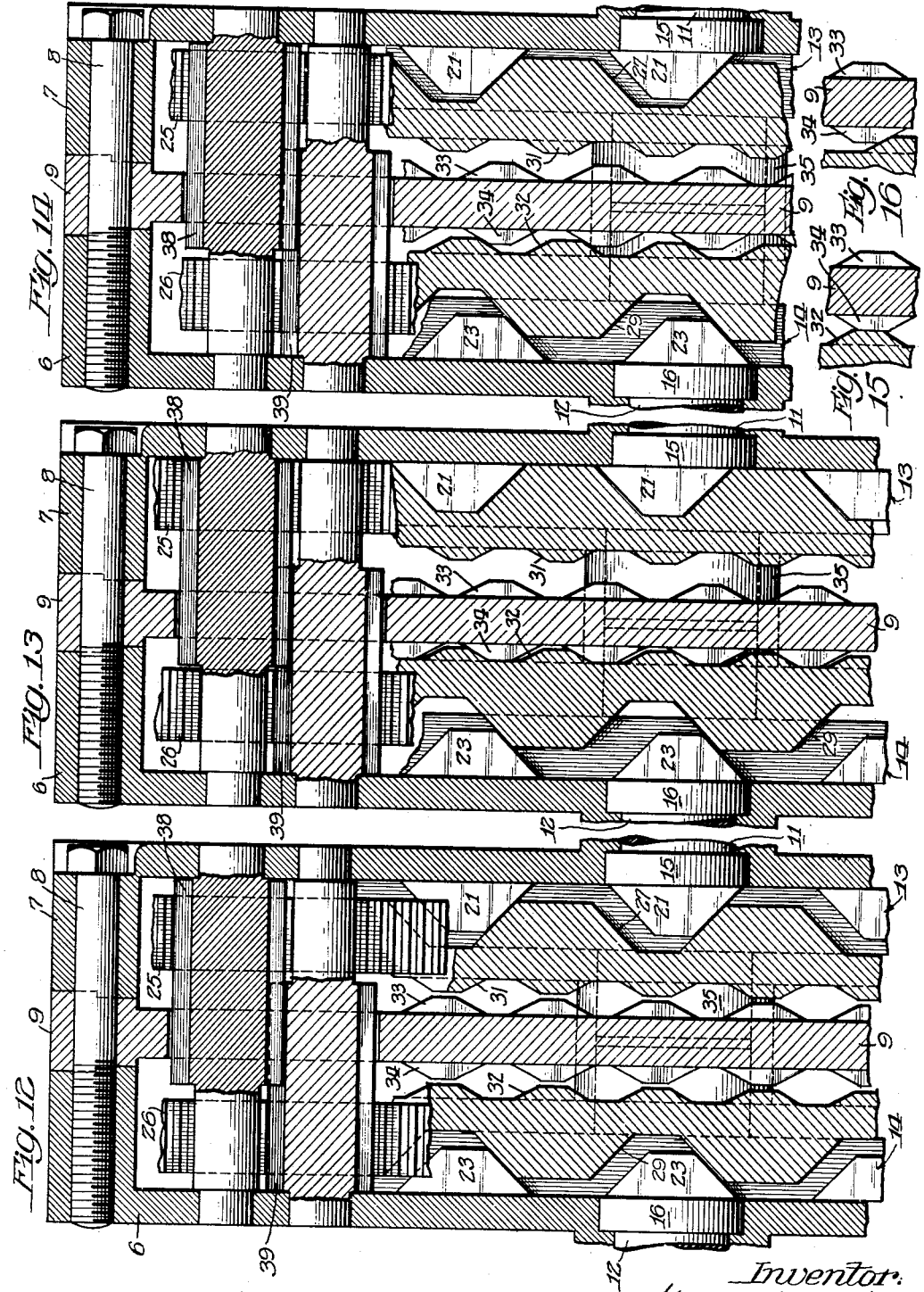

Patented Dec. 12, 1933

1,938,649

UNITED STATES PATENT OFFICE 1,938,649

DIFFERENTIAL GEAR FOR VEHICLES

George I. Welsh, Dixon, Ill.

Application June 5, 1931. Serial No. 542,350

9 Claims. (Cl. 74—99)

This invention relates to differential gears for vehicles and has for its object to provide a new and improved device of this description.

The old differential gear is so arranged that if one of the wheels begins to slip or spin, the other wheel loses traction and the vehicle cannot be propelled. One of the objects of my invention is to provide a differential gear which will remedy this defect in such a manner as not to interfere with the action of the other parts of the differential gear.

The invention has as a further object to provide a differential gear which will automatically act to cause both wheels to be driven, regardless of the slipping or spinning of either wheel, and without in any manner interfering with the action of the differential in turning.

The invention has as a further object to provide a differential gear arranged so that if one wheel turns too easily it will be prevented from turning faster than its mate, while if both wheels have sufficient traction they will be driven with sufficient speed required to do their share of the work.

The invention has as a further object to provide a differential gear having a clutch arrangement with automatic control for the purpose of preventing a wheel, that has insufficient traction to do its share of the driving, from turning faster than its mate, but not propelling the vehicle under normal conditions or interrupting the desirable compensating function of the gears. The invention has other objects which are more particularly pointed out in the accompanying description.

Referring now to the drawings, Fig. 1 is a horizontal sectional view through one form of device embodying the invention, showing the parts in their neutral position with the vehicle travelling with normal traction on both wheels;

Fig. 2 is a sectional view taken on line 2—2 of Fig. 1;

Fig. 5 is a sectional view taken on line 5—5 of Fig. 3;

Fig. 6 is a sectional view taken on line 6—6 of Fig. 3;

Fig. 7 is a sectional view similar to the central portion of Fig. 1 with central sleeve and cam members unsectioned;

Fig. 8 is a view similar to Fig. 7 showing the position of the parts just after the slipping of the wheel on the right;

Fig. 9 is a sectional view taken on line 9—9 of Fig. 7;

Fig. 10 is a sectional view taken on line 10—10 of Fig. 8;

Fig. 11 is a perspective view showing the parts separated and before being assembled, as shown in Fig. 1;

Fig. 12 is a sectional view taken on line 12—12 of Fig. 3 and straightened out, showing the parts in their neutral position;

Fig. 13 is a view similar to Fig. 12 showing the position of the parts just after the right wheel has slipped;

Fig. 14 is a view similar to Fig. 12 showing the position of the parts in making a left turn;

Fig. 15 is a view showing one position of the clutch members in making a left turn;

Fig. 16 is a view showing the next position of the clutch members in making a left turn.

Like numerals refer to like parts throughout the several figures.

Figure 1:
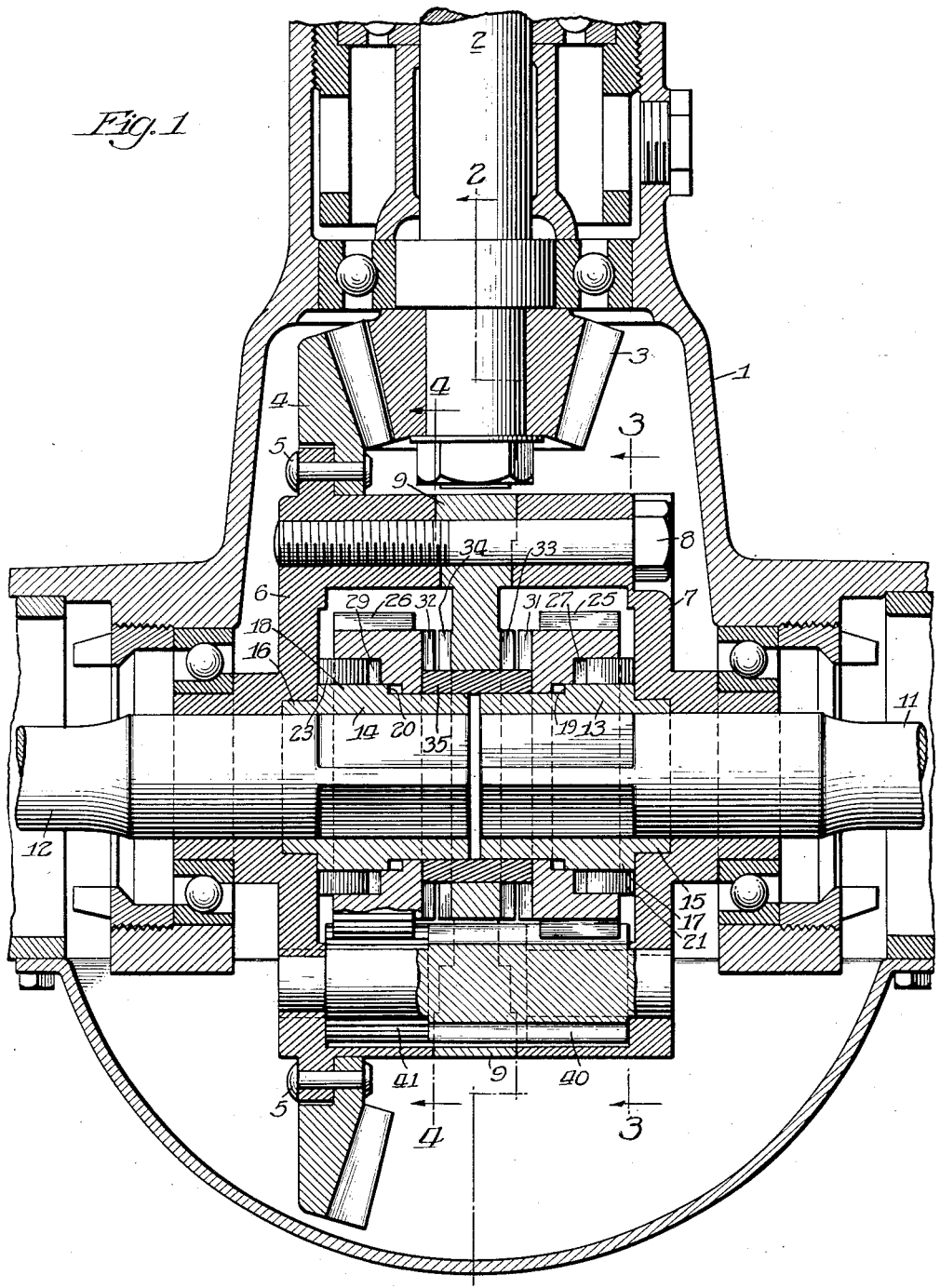

Referring now to the drawings, I have illustrated in Fig. 1 one form of device embodying the invention, with the parts in operative connection with the driving shaft. In this construction the device is assembled in a suitable cover 1 into which projects the end of the driving shaft 2 provided with a pinion 3 which engages the gear 4. This gear is shown as a ring gear and is removably connected by fastening devices 5 with one member 6 of the gear case. The member 6 of the gear case is connected with the gear case member 7 by means of fastening devices 8 which are shown as screws. Intermediate the gear case members 6 and 7 is a clutch member 9. The fastening devices 8 also pass through this clutch member so that the gear case members and the clutch member rotate as a unit when the driving shaft is in operation. The axles 11 and 12, to which the two driving wheels of the vehicle are connected, extend into the gear case members, as shown, with their ends in proximity. These ends are non-circular and mounted upon these two non-circular ends are the axle cams 13 and 14, the axles and the axle cams rotating together. These axle cams have the reduced outer end portions 15 and 16 which fit into recesses in the gear case members. The axle cams 13 and 14 are provided with the enlarged portions 17 and 18, which, at their outer ends, engage the gear case members. Their inner ends are provided with shoulders 19 and 20. The axle cam 13 is provided with the cam members 21 which have on their sides inclined cam faces. The axle cam 14 is provided with the cam members 23 having on their sides the inclined cam faces. These axle cams are shown separately at the right and left hand ends of Fig. 11.

Slidably mounted upon the axle cams 13 and 14 are the axle gears 25 and 26. The axle gear 25 is provided on the interior thereof with the gear cam members 27 which have on their sides inclined cam faces. The axle gear 26 also has similar gear cam members 29 which have on their sides inclined cam faces. The gear cam members on the gears may be integral therewith or may be made separate therefrom and attached thereto. These gear cam members on the gears project between the spaces of the axle cam members 21 and 23 respectively with their inclined faces in engagement. These axle gears 25 and 26, with their cam members, are shown separately in Fig. 11.

The axle gear 25 has on its inner face teeth 31, and the axle gear 26 has on its inner face teeth 32. The teeth 31 are opposed to teeth 33 on the clutch member 9, and the teeth 32 are opposed to teeth 34 on the opposite side of the clutch member 9. Means are provided for preventing the teeth 31 and the teeth 32 from simultaneously engaging the teeth on the clutch member 9. Any suitable means for this purpose may be used. As herein shown there is provided a spacer sleeve 35 which passes through the central opening of the clutch member 9, and which has its ends engaging the axle gears 25 and 26. This spacer sleeve is clearly shown in Fig. 1. It will thus be seen that as one axle gear is moved toward the clutch member 9 the other axle gear is moved away from it by this spacer sleeve 35. It will be seen that this prevents the teeth of both of the axle gears from simultaneously engaging the teeth of the clutch member 9.

Figure 3:
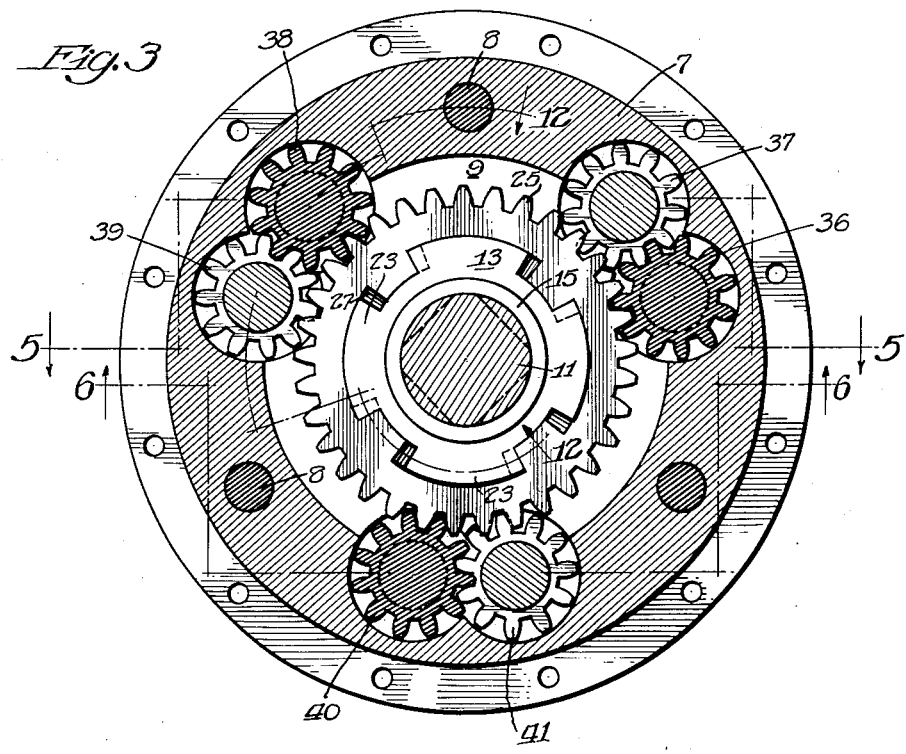
Fig. 3 is a sectional view taken on line 3—3 of Fig. 1.
Figure 4:
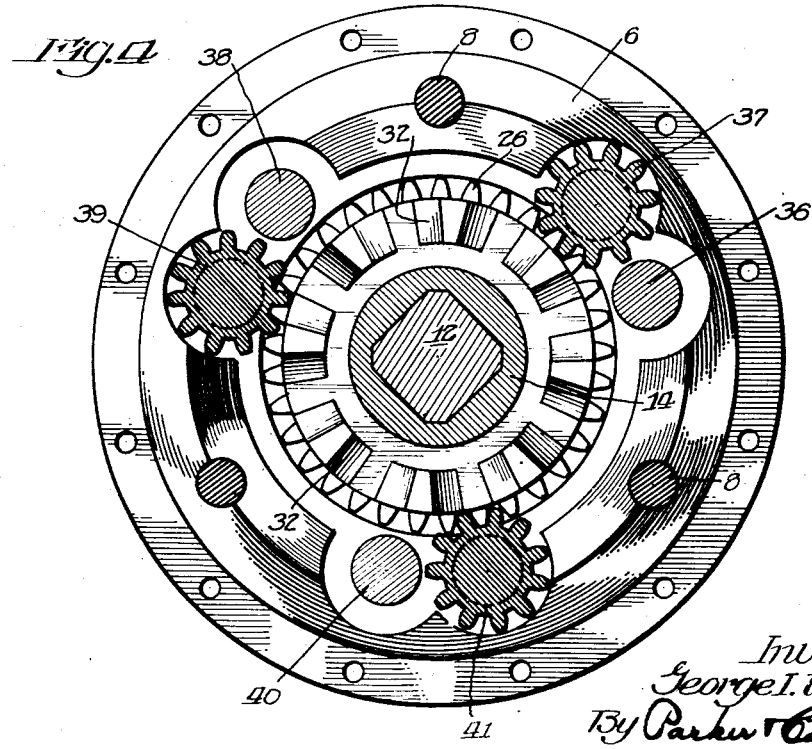
Fig. 4 is a sectional view taken on line 4—4 of Fig. 1.

Rotatably mounted within the gear case members are a series of differential gears 36, 37, 38, 39, 40 and 41 arranged in pairs, as clearly shown in Fig. 3. These gears extend through the clutch member 9 and have journals at their ends, which are journaled in the two gear case members 6 and 7, as shown in Fig. 1, which at the bottom shows the differential gear 40. The teeth on these gears extend only part way therealong.
Gears 37, 39 and 41, Fig. 4, have teeth which engage the axle gear 26, and gears 36, 38 and 40 have teeth which engage the axle gears 25, Fig. 3. When the parts are in their neutral position, as shown in Fig. 1, and the driving shaft 2 is rotated, this rotates the gear 4 and the gear casing, consisting of the gear case members 6 and 7. Since the differential gears 36 to 41 are connected with the gear case members, they also rotate with the gear case members, and since they are in engagement with the axle gears 25 and 26, these axle gears are rotated so as to rotate the axles 11 and 12 and wheels connected therewith.

The angle of the teeth on the gears 25 and 26 and the angle of the teeth on the clutch member 9 may of course be varied, and this angle would depend upon the conditions presented. I have found that very good results, where the gears and teeth will properly engage and there will be no noise produced by these parts, will be secured by making the angle of these teeth between 25° to 28° or 29°. I of course do not limit myself to this angle in any particular, but am simply stating it as being a form which I have found to work with complete success.

The use and operation of my invention are as follows:

When the parts are in their neutral position, as shown in Fig. 1, and the driving shaft 2 is rotated, the gear case members 6 and 7, the clutch member 9 and the differential gears 36 to 41 are rotated, and these differential gears engaging the teeth of the axle gears 25 and 26 rotate the axle gears and the axles 11 and 12 and the wheels connected therewith.

If, now, the wheel on the right ceases to have traction, it will slide and there will be a greater amount of traction on the wheel on the left. There will therefore be a greater pressure between the cam faces of the cam members 29 on the interior of the axle gear 26 and the associated cam faces on the cam members 23 on the axle cam 14 than between the similar cam faces on the right, and this causes the axle gear 26 to be moved toward the right, as shown in Fig. 8, so that the teeth 32 thereon engage the associated teeth 34 on the clutch member 9. The spacer sleeve 35, engaging the axle gear 25, pushes it more to the right, as shown in Fig. 8. The rotation of the gear casing and the clutch member 9 then causes the axle gear 26 to rotate, thus rotating the axle 12 and the wheel associated therewith and having traction which would drive the vehicle forward.

Furthermore, since the axle gear 26 is locked to the casing, as it were, by being connected with the clutch member 9, this axle gear will be connected to the axle gear 25 by the differential gears, so that the two, as it were, will be locked together and rotate at the same speed, so that both wheels will be driven at the same speed. Now when the wheel on the right gets sufficient traction, the pressure exerted between the cam faces of the cam members 27 in the axle gear 25 and the cam faces of the cam members 22 will become sufficient to cause the axle gears 25 to automatically move to the left, and this, through the spacer sleeve 35, pushes the axle gear 26 to the left so as to disengage its teeth from the teeth of the clutch member 9, thus bringing the parts back to neutral position where both axle gears 26 and the wheels associated therewith will be driven in the normal way. In this neutral position both axle gears 25 and 26 will have their teeth out of engagement with the clutch member 9. It will thus be seen that when either wheel loses traction the device acts automatically to connect both wheels together so that both wheels will be driven and so that the one having traction can drive the vehicle along, and that as soon as both wheels get traction the device automatically acts to disconnect the wheels, each one then being separately connected with the driving shaft.

This device is so arranged that it does not affect the proper operation in turning. When the vehicle is turning, the outer wheel must rotate at a higher speed than the inner wheel, and so under these conditions if both wheels have traction and the parts are in their neutral position, this result is secured. If one of the wheels loses traction in turning, then the action of the device is such that the axle gear associated with the wheel which has traction will move back and forth so that its teeth, for a moment for example, will engage the teeth of the clutch member 9, as shown in Fig. 16, and will then be released therefrom and slide thereby, as shown in Fig. 15, this back and forth movement continuing until the turn is completed, or until both wheels get traction.

In Fig. 12 I have illustrated the relative position of the parts in the developed section on line 12—12 of Fig. 3 when the parts are in their neutral position with equal traction on the wheels.

In Fig. 13 I have shown the position of the parts after the wheel on the right has partially or wholly lost traction.

In Fig. 14 I have shown the partial connection between the axle gear and the clutch member which occurs in making a left turn. Under these conditions the teeth do not ordinarily fully engage, but partially engage, as shown in Figs. 14 and 16, and then the axle gear moves away so as to let the teeth slide past, as shown in Fig. 15, and then again partially engage with the teeth of the clutch member, thus insuring the proper driving of the wheel with traction, and yet permitting one wheel to rotate faster than the other.

I have illustrated the invention in connection with a spur gear differential, but it is of course evident that it can be used equally well with a beveled gear differential.

I claim:

1. A differential gear for vehicles comprising separated axles for the two driving wheels, longitudinally movable axle gears on said axles, differential gears connecting said axle gears, a clutch intermediate said axle gears, and means for automatically causing one of said axle gears to operatively engage said clutch when the wheel associated with the other axle gear loses traction the other axle gear being out of engagement with said clutch.

2. A differential gear for vehicles comprising separated axles for the two driving wheels, longitudinally movable axle gears on said axles, differential gears connecting said axle gears, a clutch intermediate said axle gears, means for automatically causing one of said axle gears to operatively engage said clutch when the wheel associated with the other axle gear loses traction the other axle gear being out of engagement with said clutch, and means for automatically disconnecting said axle gear and the clutch when the traction on the wheels becomes substantially equal.

3. A differential gear for vehicles comprising separated driving shafts for the driving wheels, a cam device having inclined cam faces on each shaft, an axle gear slidably mounted on each shaft and having corresponding cam devices with inclined cam faces engaging the inclined cam faces on the axles, a clutch member intermediate said axle gears and operatively connected with the driving shaft of the vehicle, differential compensating gears engaging said axle gears, a clutch engaging device associated with each of said axle gears, the said cam devices acting automatically to connect one of the axle gears with the clutch member when the traction on the wheel associated with the other axle gear decreases, and to automatically disconnect said axle gear and clutch member when the traction on the two wheels becomes substantially equal.

4. A differential gear for vehicles comprising separated axles for the two driving wheels, axle gears on said axles, differential gears connected with said axle gears, a clutch member fixed against lateral movement located intermediate said axle gears and having teeth opposed to the axle gears, and means for automatically causing the teeth on the axle gears and the clutch to automatically engage and disengage in turning.

5. A differential gear for vehicles comprising separated driving shafts for the driving wheels, a cam device having inclined cam faces on each shaft, and axle gears slidably mounted on each shaft and having corresponding cam devices with inclined cam faces engaging the inclined cam faces on the axles, teeth on the opposed faces of the axle gears, a clutch member intermediate said axle gears and operatively connected with the driving shaft of the vehicle and having teeth opposed to the teeth on the axle gears, and means for preventing the teeth on one axle gear from engaging the teeth on the clutch member when the teeth on the other axle gear engage the teeth on the clutch member.

6. A differential gear for vehicles comprising separated driving shafts for the driving wheels, a cam device having inclined cam faces on each shaft, and axle gears slidably mounted on each shaft and having corresponding cam devices with inclined cam faces engaging the inclined cam faces on the axles, teeth on the opposed faces of said axle gears, a clutch member intermediate said axle gears and operatively connected with the driving shaft of the vehicle and having teeth opposed to the teeth on the axle gears, means for preventing the teeth on one axle gear from engaging the teeth on the clutch member when the teeth on the other axle gear engage the teeth on the clutch member, and means responsive to said cam faces depending on the traction on the driving wheels for moving said axle gears toward and away from said clutch member.

7. A differential gear for vehicles comprising separated driving shafts for the driving wheels, an axle gear slidably mounted on each shaft and having teeth on their opposed faces, a clutch member intermediate said axle gears and having teeth on the faces opposed to the teeth on the axle gears, and means responsive to the unequal traction on the wheels for moving one of said axle gears so that its teeth engage the teeth on the clutch member and means for preventing the other axle gear from engaging the teeth of said clutch member when the first mentioned axle gear teeth are in engagement therewith.

8. A differential gear for vehicles comprising separated driving shafts for the driving wheels, an axle gear slidably mounted on each shaft and having teeth on their opposed faces, a clutch member intermediate said axle gears and having teeth on the faces opposed to the teeth on the axle gears, means responsive to the unequal traction on the wheels for moving one or the other of said axle gears so that its teeth engage the teeth on the clutch member, and means for preventing the teeth on one axle gear from engaging the teeth on the clutch member when the teeth on the other axle gear engage the teeth on the clutch member.

9. A differential gear for vehicles comprising separated axles for the two driving wheels, and means for automatically connecting the two axles when the traction on one wheel decreases and responsive thereto, and for disconnecting the two axles when the traction on the wheels becomes substantially equal, and means for causing said axles to automatically alternately and successively connect and disconnect while the vehicle is turning.

GEORGE I. WELSH.